Feb. 7, 1928.
J. B. DAVIS
1,658,117
DISPENSING PUMP
Filed Nov. 6, 1922    4 Sheets-Sheet 4
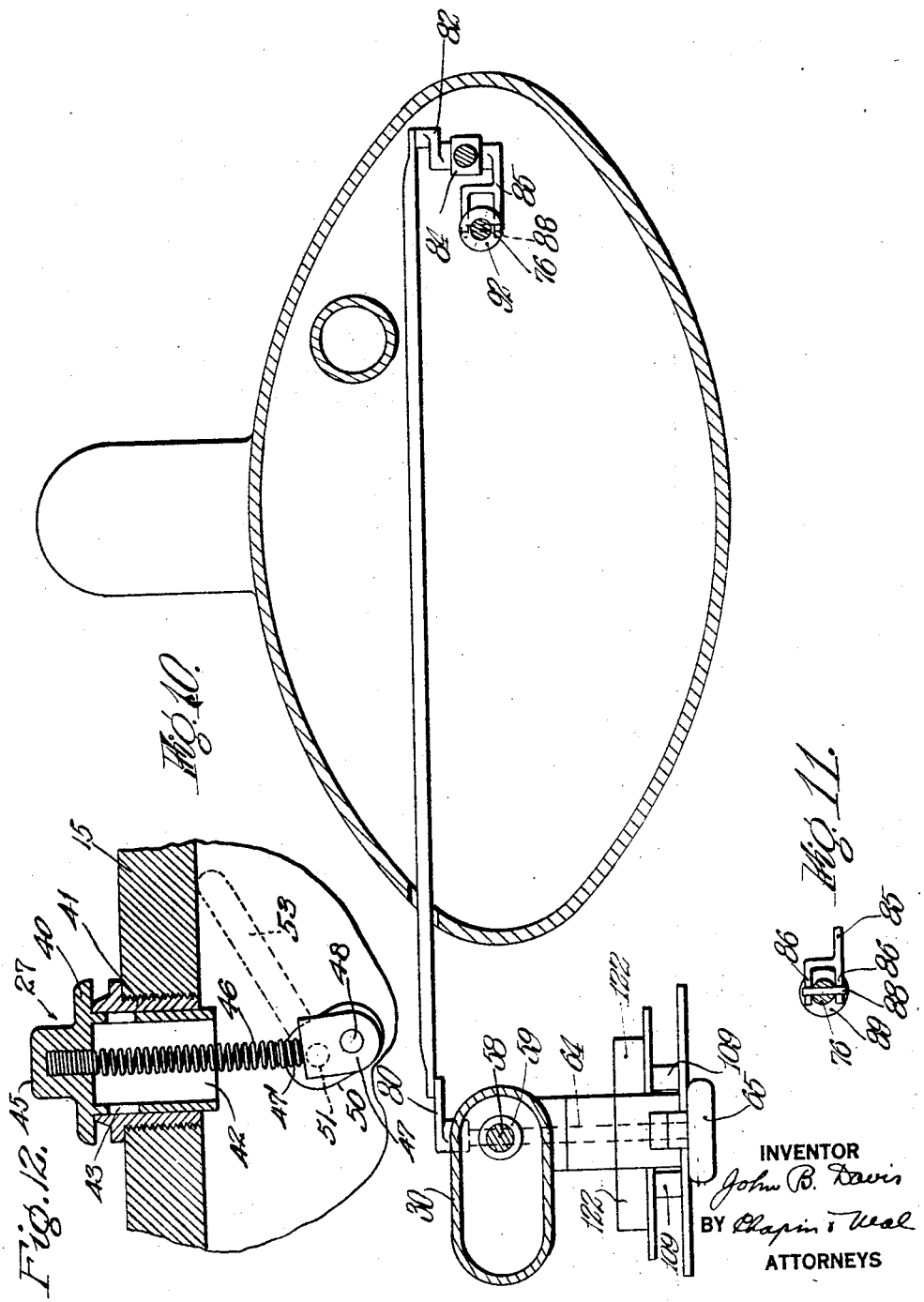

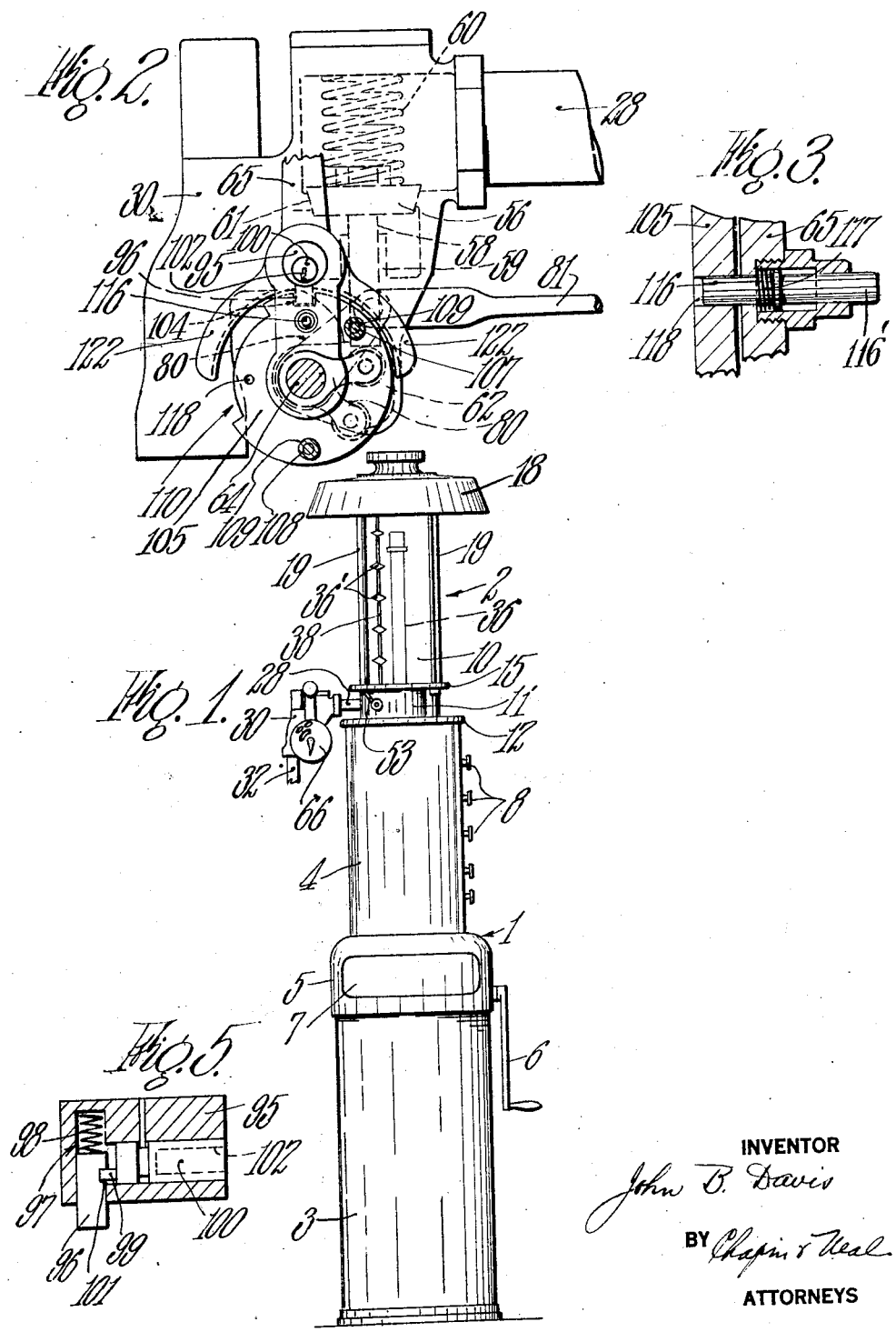

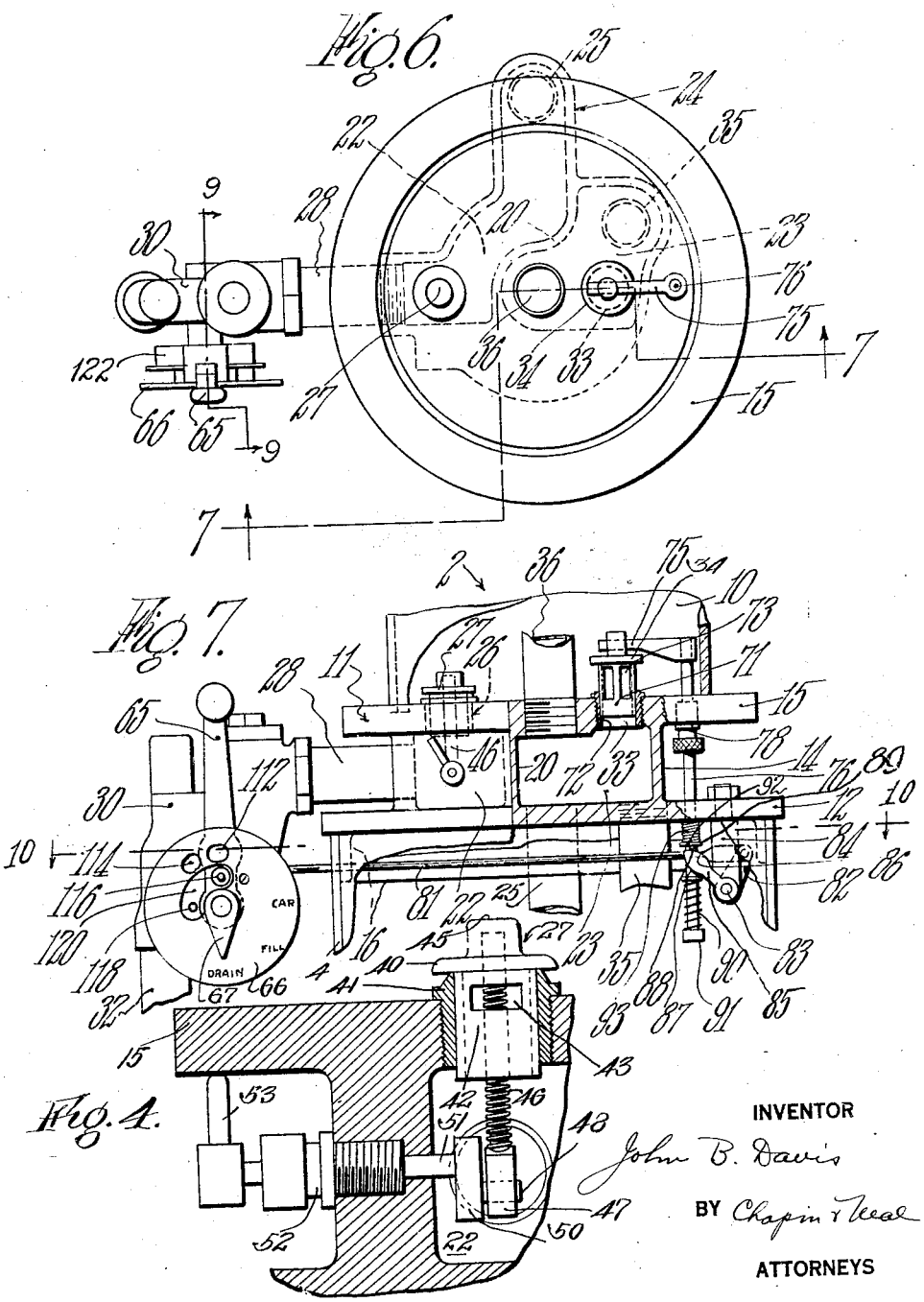

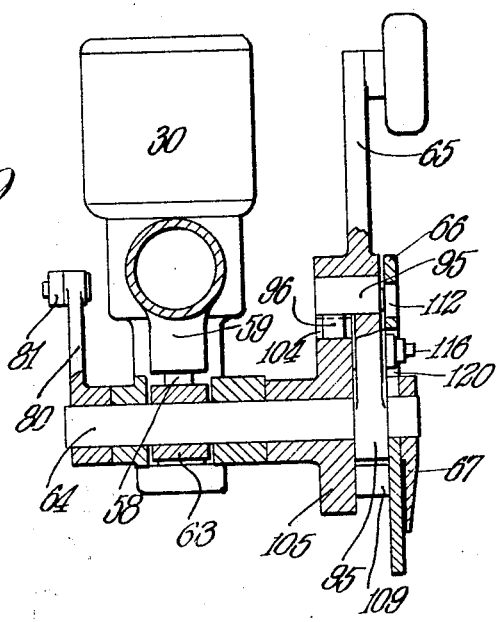
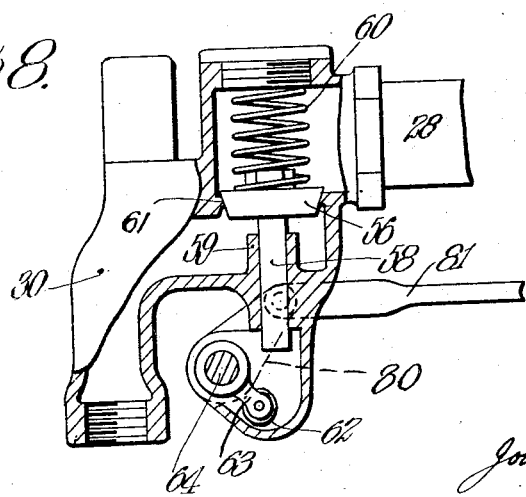

Patented Feb. 7, 1928.

1,658,117

UNITED STATES PATENT OFFICE.

JOHN B. DAVIS, OF SPRINGFIELD, MASSACHUSETTS, ASSIGNOR TO GILBERT & BARKER MANUFACTURING COMPANY, OF WEST SPRINGFIELD, MASSACHUSETTS, A CORPORATION OF MASSACHUSETTS.

DISPENSING PUMP.

Application filed November 6, 1922. Serial No. 599,393.

The present invention relates to improvements in dispensing or measuring pumps such as are commonly used for dispensing gasoline and like oils.

Dispensing pumps as heretofore constructed may, in general, be classified either as visible measuring pumps or as non-visible measuring pumps. In pumps of the visible measuring type the liquid before being delivered to the customer is pumped into a graduated transparent reservoir thereby enabling the customer to verify the measurement by observation of the liquid level in the reservoir. In pumps of the non-visible or so-called blind measuring type, on the other hand, the liquid to be dispensed is not visible to the customer at any time until it is finally delivered. Each of the above named types of pump has certain peculiar advantages not possessed by the other. The visible type pump, for example, protects the customer against fraud while the pumps of the non-visible type are commonly of somewhat simpler construction and are capable of being more expeditiously operated.

One of the objects of the present invention is to provide a dispensing pump which is capable of being used either as a pump of the visible measuring type or as a pump of the non-visible measuring type and which is readily convertible at will from a pump of one of said types to a pump of the other type.

By thus providing a pump which is convertible at will as above set forth the owner of the pump is enabled, by adjustment thereof, to readily avail himself of the advantageous feature of either type of pump as occasion may require. The convertible feature of the present invention is particularly valuable in the event of breakage or injury to the visible measuring reservoir inasmuch as the pump may then be readily converted into a pump of the non-visible type and thus the pump may be continued in service, the liquid being measured in the pump cylinder with the aid of the quantity stops and delivered to the customer without passing into the visible measuring reservoir.

It is a further object of the present invention to provide means rendering it inconvenient and impracticable for the drain valve to be opened unknown to the customer at any time after the operator has started to fill the transparent reservoir.

With this object in view another feature of the invention contemplates broadly the provision of a single handle, lever or the like for controlling both the ultimate delivery of liquid to the customer and the actuation of the drain valve, and means operative after said handle or lever has been moved for the purpose of effecting the delivery of the liquid and the closing of the drain valve, to prevent surreptitious and fraudulent opening of the drain valve by the attendant.

More specifically this feature of the invention consists in the provision, in connection with a valve for controlling the delivery of liquid from a visible measuring reservoir, and a second valve for controlling drainage of the liquid from said reservoir to a source of supply, of means for actuating both of said valves, said means including an operating handle or lever adapted to be moved from a normal position in which said delivery valve is closed and said drain valve is open to a second position in which both said valves are closed, and thence to a third position in which said delivery valve is open and said drain valve is closed, means including a key-releasable lock for securing said handle in said normal position, and for preventing free return of the handle from second to normal position, and means rendering necessary the removal of the key from the lock before the handle can be moved from normal to second position and the replacing of the key in the lock and its subsequent withdrawal therefrom before the handle can be returned from the second to the first position.

Another object of the present invention is to provide, in a visible measuring pump having a valve for controlling the delivery of liquid from the measuring reservoir to the customer, and a second valve for controlling the drainage of the liquid from said reservoir to the source of supply, of means operative when the first named valve is open to unyieldingly hold the second valve in closed position and thereby positively insure against possibility of drainage of the liquid from the measuring reservoir to the source of supply while the liquid is being delivered to a customer. In the illustrated embodiment of the invention means is also provided whereby the drain valve may be positively locked in closed position when the delivery valve is open.

A further object of the invention is to provide various other new and useful improvements in the construction and mode of operation of dispensing pumps of the visible measuring type for the purpose of preventing the same from being fraudulently manipulated, increasing their field of usefulness, and rendering them more efficient and reliable in operation.

With the above and other objects in view, as will later appear, the invention consists in the features of construction, and in the combinations and arrangements of parts hereinafter described and claimed, the advantages of which will be apparent to those skilled in the art.

The invention will be explained by reference to the accompanying drawings, illustrating the preferred embodiment thereof, in which:—

Fig. 1 is a view, in side elevation, of the improved liquid dispensing apparatus;

Fig. 2 is a side elevational view, on an enlarged scale, of the delivery valve and showing particularly a portion of the mechanism for controlling said valve in unison with the drain valve and for locking and unlocking said valves;

Fig. 3 is a detail sectional view showing a portion of the valve controlling mechanism;

Fig. 4 is a detail sectional view showing a supply valve which controls the filling and emptying of the visible reservoir together with the means for actuating said valve;

Fig. 5 is a sectional view of the lock shown in Fig. 2;

Fig. 6 is a plan view of the portion of the pump casing which supports the transparent reservoir, this view showing also the delivery valve and part of the control mechanism therefor;

Fig. 7 is a view, partially in side elevation and partially in section, of the mechanism shown in Fig. 6, the section being taken substantially along the line 7—7 of Fig. 6;

Fig. 8 is a sectional view of the discharge valve;

Fig. 9 is a sectional view taken on the line 9—9 of Fig. 6;

Fig. 10 is a sectional plan view taken on the line 10—10 of Fig. 7;

Fig. 11 is a fragmentary sectional plan view taken at a slightly lower level than Fig. 10; and Fig. 12 is an enlarged sectional view of the supply valve and its actuating mechanism.

Referring to Fig. 1 of the drawings, the invention is therein shown as embodied in a pump of the well-known visible measuring type, an example of which is shown in a co-pending application, Serial No. 513,368, filed Nov. 7, 1921, by the present applicant. In common with the pump of said application, the present pump comprises an upright pump casing 1 within which the greater part of the working mechanism is mounted, and a transparent reservoir or measuring chamber 2 which surmounts the pump casing. The casing 1 comprises a lower cylindrical casing member 3, which encloses the pump cylinder, an upper casing member 4 of elliptical cross-sectional contour, and an intermediate casing member 5 which is fitted over the top of the lower member 3 and within the bottom of the upper member 4. The pump cylinder, its piston and the piston-actuating mechanism are or may be of the same construction as that disclosed in my prior U. S. Letters Patent No. 1,447,511, dated March 6, 1923, and inasmuch as these elements constitute no part of the present invention it is not deemed necessary to illustrate or describe them herein, reference being had to said patent for a complete disclosure of the construction and mode of operation thereof. For present purposes it will be sufficient to state that the pump piston is adapted to be actuated either manually by means of a crank handle 6 or pneumatically under the control of a suitable valve which may be rendered accessible by the removal of a cover plate 7.

In order that the pump may be set to deliver different predetermined quantities of liquid, a series of quantity stops may be provided which are adapted to be selectively positioned in the path of a reciprocating cross-head carried by the pump piston to limit in different degrees the stroke of the piston. The construction of the quantity stops and the manner in which they perform their functions may be the same as that set forth in detail in my prior U. S. Letters Patent No. 1,449,218, dated March 20, 1923, and in my co-pending application, Serial No. 513,369, filed Nov. 7, 1921. In the illustrated pump, as in the pump of the application last mentioned, the quantity stops may be connected with buttons 8 upon the exterior of the casing 4 by means of which they may be conveniently actuated.

The reservoir 2 comprises a glass shell 10 of open ended cylindrical form. The shell 10 is supported by means of a frame member 11, which is, in turn supported by the casing member 4. The frame member 11 comprises a lower disk 12, an intermediate cylindrical neck 14 and an upper disk 15. A vertically disposed annular flange 16 depends from the marginal portion of the lower disk 12 and fits within the upper end of the casing member 4 to which it is rigidly secured. The glass shell 10 is arranged with its axis vertical and its lower edge resting within an annular groove in the upper disk 15 of the frame member 11. The upper edge of the glass shell 10 is received in a suitable groove in the lower face of a cap 18 and the cap 18 is drawn toward the frame member 10 by means of the rods 19 so that the glass shell is securely held in place to form a fluid tight reservoir. The interior of the neck 14 is divided by means of a curved vertical partition wall 20 into a supply chamber 22 and a drain chamber 23.

The supply chamber 22 is provided with a laterally offset portion 24 (Fig. 6) into which discharges a supply pipe 25, the latter extending outside of the casing member 4 and being connected at its lower extremity to the pump cylinder. A passage 26 in the upper disk 15 of the frame member 11 connects the supply chamber 22 with the reservoir 10, said passage 26 being provided with a supply valve 27 adapted to open and close the same. A discharge pipe 28 is threaded into the outer side wall of the supply chamber 22 and a valve casing 30 connects said discharge pipe with the usual flexible delivery pipe or hose 32.

The drain chamber 23 is adapted to be connected with the reservoir 10 by means of a passage 33 in the upper disk 15 of the frame member 11 and said passage is adapted to be opened and closed by means of a valve 34. A drain pipe 35 leads from the drain chamber 23 to a supply tank (not shown), said drain pipe entering the drain chamber through its lower wall. The drain chamber 23 is also connected with the reservoir 10 by means of an overflow pipe 36, the latter rising vertically from the top wall of said chamber. The upper end of the overflow pipe 36 is open and is located at such an elevation within the reservoir 10 as to accurately determine the maximum quantity of liquid to be dispensed. The maximum quantity of liquid which the pump is designed to dispense, as well as various fractional parts of said volume, is indicated by means of a scale consisting of a plurality of markers 36' which are arranged one above another upon the outside of the reservoir 10 and are rigidly secured upon a vertical supporting rod 38.

The present invention is concerned, among other things, with certain novel features relating to the construction and arrangement of the valves 27, 56, and 34 and in the provision of means whereby said valves are controlled and actuated and whereby the pump is locked and unlocked in certain conditions of adjustment for the purpose of preventing fraud and securing efficient and reliable operation of the pump.

The supply valve 27, as best shown in Figs. 4 and 12, comprises a flat disk 40 which is adapted to seat against the upper end of a bushing 41 that is screw-threaded into the disk 15. Depending from the disk 40 is a skirt 42 which is adapted to slide within the bushing 41, said skirt serving to guide the valve in its opening and closing movements and having one or more apertures 43 through which liquid may flow when the valve disk is unseated. The valve disk 40 is provided with a hub 45, which is recessed in its lower face to provide a socket into which is fastened the upper end of a coiled spring 46. At the lower end of the spring 46, is an eye bolt 47, the screw-threaded shank 47' of which extends within the coils of the spring with its threads interlocking with said coils to securely fasten the eye-bolt and spring together. Projecting into the aperture in the eye-bolt 47 is a crank pin 48 carried by a crank arm 50 on a horizontal rock shaft 51 that is journaled in the outer side wall of the supply chamber 22. The rock-shaft 51 extends through a stuffing box 52 and is adapted to be actuated by means of a handle 53 that is rigidly secured to its outer end. When the above described parts occupy the illustrated positions, the spring 46 is stretched sufficiently to hold the valve disk 40 to its seat under pressure. In moving the crank pin 48 into the position illustrated the handle swings upwardly until it engages the upper disk 15 of the frame member 11 thus moving the crank pin just beyond a dead center position with respect to the pull of the spring thereon, as clearly shown in Fig. 12. Thus the tensioned spring 46 will hold the handle 53 against the disk 15 which limits further upward movement of the handle so that the spring is maintained under tension and the valve firmly held to its seat. By turning the handle 53 in a counter clockwise direction, the crank pin 48 may be swung across dead center position in the opposite direction and then upwardly, the upward movement first causing the spring 46 to be relieved of all tension so that the adjacent coils thereof will contact with one another and thereafter raising the valve disk from its seat by the lifting effect of the solidly collapsed spring which then transmits the upward movement of the crank pin 48 unyieldingly to the valve. The valve is thus positively opened and unyieldingly held in open position until the handle 53 is again actuated.

The delivery valve casing 30, as best shown in Fig. 8, comprises a chambered casing, the inlet end of which is connected to the discharge pipe 28. The outlet end of the casing is connected to hose 32, as shown in Fig. 1. Intermediate the inlet and outlet of the casing is a valve seat 61 and cooperating therewith is a valve 56, which is normally held to its seat by a spring 60, interposed between the upper face of valve 56 and the opposed portion of the valve casing. Fixed to valve 56 is a depending stem 58 which is slidably received in a guide 59, formed in the valve casing. Stem 58 extends entirely through and below guide 59 and adjacent the lower end of stem 58, is a rock shaft 64, rotatably mounted in the valve casing, as shown in Fig. 9. Fixed to shaft 64 is an arm 63 on the outer end of which is a roll 62, adapted to engage the lower end of stem 58 and lift the same against the force of spring 60 to raise valve 56 from its seat. For actuating the rock shaft, a handle 65 is fixed thereto near one end (Fig. 9). Shaft 64 extends beyond handle 65, passes through a dial plate 66 and carries a pointer 67 to cooperate with the dial. The latter is appropriately marked to indicate, adjacent the different positions which it may assume, the results effected thereby. For example, as shown in Fig. 7, the dial may be marked "Drain," "Fill" and "Car" to indicate, respectively, the inactive position of handle 65, the position in which the reservoir 2 may be filled, and the position in which liquid from the reservoir may be delivered through casing 30 and hose 32 to the car. The handle 65 occupies the "Drain" position when the pump is not in use and, when the handle is so positioned, the drain valve 34 is opened. There is sufficient clearance between roll 62 and stem 58 so that the latter is not engaged by the former during the movement of handle 65 from "Drain" to "Fill" position. Movement of the handle from "Fill" to "Car" position will, however, cause roll 62 to engage and lift stem 58 to open the delivery valve.

The drain valve 34 is similar in construction to the supply valve 27. As shown, the drain valve 34 comprises a horizontal disk having an apertured sleeve 71 which depends from said disk and is slidable vertically within a bushing 72. The bushing 72 is threaded into the drain passage 33 and the upper end of said bushing constitutes a valve seat with which the lower face of the disk 34 is adapted to engage. The apertures in the sleeve 71 are indicated at 73 and are so located that when the drain valve is open, as shown in Fig. 7, the liquid in the reservoir 10 will drain through the passage 33, the drain chamber 23 and the drain pipe 35 to the source of supply until the reservoir has been emptied or substantially so.

In order that the drain valve may be manually actuated, the same is carried by means of a finger 75 that is secured to the upper end of a vertical slide rod 76, the latter extending downwardly through the disk 15 at a point outside of the neck 14 and thence through the disk 12. A stuffing box 78 surrounds the slide rod 76 where it extends through the disk 15 to prevent outward leakage of liquid from the reservoir 10. The drain valve 34 is adapted to be actuated from the handle 65, which also opens and closes the delivery valve 56, and to this end the slide rod 76 is operatively connected with the rock-shaft 64 in the following manner. An arm 80 (Fig. 2) on the rock-shaft 64 is connected by a link 81 (Fig. 7) with an arm 82 on a rock-shaft 83 that is mounted to turn in a bracket 84 depending from the frame member 11. A second arm 85 is fixed upon the rock-shaft 83 substantially at right angles to the arm 82 so that the arms 82 and 85 constitute, in effect, the two arms of a bell-crank lever. The arm 85 is forked at its free end to straddle the slide rod 76 and the fork arms are each provided with suitable upper and lower segmental bearing faces 86 and 87, respectively, the upper segmental faces 86 being adapted to engage the oppositely projecting ends of a pin 88 which is driven transversely through the slide rod 76, while the lower segmental faces 87 are adapted to engage with a washer 89 which is slidable on the rod 76. A spring 90 surrounds the lower portion of the slide rod 76 between the washer 89 and a head 91 on the slide rod. The transverse pin 88 supports a washer 92 which encircles the slide rod 76 and a spring 93 is coiled around said slide rod between the washer 92 and the lower disk 12 of the frame member 11, said spring tending to move the slide rod 76 downwardly and to hold the drain valve 34 closed. When the operating handle 65 occupies the position in which it appears in Figs. 2 and 7 of the drawings, the delivery valve 56 will be closed and the drain valve 34 will be held open against the influence of the spring 93 by means of the arm 85, the latter being held at the upward limit of its swinging movement by its connections with the rock-shaft 64 and serving to keep the spring 93 compressed and to hold the slide rod in its uppermost position.

Referring to Figs. 2 and 7 it will be seen that when the handle is positioned as therein shown the delivery valve is closed and the drain valve is open, the latter being held open by the arm 85 which compresses the spring 93 and holds the slide rod 76 in its uppermost position. This is the position of the delivery and drain valves when the pump is to be left idle over night or for any other considerable period of time. The drain valve 34 being open, the contents of the reservoir is permitted to drain back through the chamber 23 and pipe 35 to the source of supply. When the handle 65 and the valves 56 and 34 are positioned as just described, the pointer 67 registers with the word "Drain" upon the dial plate 66.

When it is desired to pump liquid into the reservoir 10, it is of course necessary that the supply valve 27 shall be opened to admit the liquid from the supply chamber and that the delivery valve 56 shall be closed to prevent the delivery of liquid before the same has entered the transparent reservoir and thus to enable the customer to verify the measurement thereof. It is also necessary that the drain valve 34 shall be closed. In the present apparatus, the operative connection between the rock-shaft 64 and the valves 56 and 34 is such that by swinging the operating handle 65 so as to move the pointer 67 from "Drain" to "Fill" positions, the drain valve will be moved from open to closed position while the delivery valve will be permitted to remain in closed position. The mode of operation of the drain valve will be clear from an examination of Fig. 7 wherein it will appear that the downward swinging movement of the arm 85, due to the shifting of the handle from drain to fill positions, will relieve the compression of the spring 93, thus permitting the latter to close the drain valve and to hold it closed by such pressure as the partially expanded spring 93 is capable of exerting. It will also be observed that the arm 85, in its downward movement, slides the washer 89 downwardly upon the rod 76 thereby compressing to a certain extent the spring 90 so that said spring is rendered effective to assist the spring 93 in holding the valve 34 closed. After the reservoir 10 has been filled, or a measured quantity of liquid as predetermined by the use of a selected quantity stop has been pumped therein, it is only necessary to open the delivery valve 56 to enable the measured liquid to flow through the delivery hose 32 into the tank or receptacle of the customer. The opening of the delivery valve is readily accomplished by turning the operating handle so as to shift the pointer 67 from "Fill" position to "Car" position. In accordance with an important feature of the present invention, however, the construction and arrangement is such that the above mentioned movement of the handle 65 is effective, through the operative connections between the rock-shaft 64 and the arm 85, to further compress the spring 90 and the movements of said connections are so gaged that when the pointer 67 is brought into registry with the word "Car" upon the dial plate 66 the adjacent convolutions of the spring 90 will be brought solidly into contact with each other so that the drain valve 34 will be firmly held to its seat so long as the handle is maintained in "Car" position.

When handle 65 is moved to "Car" position to open the delivery valve 56, the operator has to hold the handle in this position during the delivery of the contents of reservoir 2. As a convenience, means are provided whereby the handle may be held in such position without effort on the part of the operator. To this end, a bolt 116 is slidably mounted in handle 65 and extends transversely therethrough, having an operating end 116' projecting from the front face of the handle. A spring 117 normally holds the other end of bolt 116 flush with the rear face of the handle. Adjacent said rear face is a disk 105 suitably secured to an adjacent part of the casing 30 and in this disk is a hole 118, into which bolt 116 may be projected, when handle 65 is in "Car" position, by pushing inwardly upon the end 116'. The spring 60, associated with the delivery valve, tends to move handle 65 from "Car" position to "Fill" position and is effective to frictionally retain bolt 116 in hole 118 against the force of spring 117. The dial plate 66 is provided with an arcuate slot 120 to receive bolt 116, and its associated parts and permit free movement of the handle 65 from "Drain" to "Car" positions.

The above described arrangement insures that the drain valve may be positively held in closed position without the intervention of any yielding interconnecting element between the valve and the operating handle. This feature is important inasmuch as it positively protects the customer against possible escape of liquid from the reservoir into the drain chamber 23 during the delivery of the liquid through the valve 56.

Associated with handle 65 is a locking device which is utilized not only to lock the handle in "Drain" position but also to prevent it from being readily shifted from "Fill" to "Drain" position and back again. The locking device, as shown in detail in Fig. 5, is contained within a cylindrical lock casing 95 which is fitted and rigidly secured in a recess of corresponding shape in the handle. The locking element consists of spring-pressed bolt 96 which plays in a transverse socket 97 in said casing. The lock bolt 96 is urged into locking position by a spring 98 in the socket 97 and is adapted to be withdrawn into an unlocking position within the lock casing by means of a pin 99 which projects eccentrically from the inner end of a tumbler barrel 100 and is received within a notch 101 in the lock bolt 96. The tumbler barrel is disposed longitudinally of the cylindrical lock casing and is normally locked against rotation by means of plungers carried thereby which engage with shoulders or the like on the lock casing and are adapted to be disengaged from said shoulders to free the barrel for rotation by means of a key which is inserted within the barrel. This locking mechanism being of the well-known plunger type of lock construction it is thought to be unnecessary to illustrate the locking plungers, it being understood that they are mounted in the usual manner in the barrel 100 and that said barrel is slotted as shown at 102 to receive a key.

The locking device cooperates with the stationary disk 105 which lies adjacent thereto. The handle 65, as shown in Fig. 9, has a part which overlies the periphery of disk 105 and in this part the barrel 95 is received with its lower peripheral portion closely adjacent the periphery of the disk. The barrel is so located that the bolt 96 may be projected radially inward toward disk 105. The spring 98 at all times urges bolt 96 in such direction and the bolt is moved in the other direction by a key inserted in slot 102. The disk 105 has a notch 104 in its periphery into which bolt 96 is projected when the handle is moved to drain position. This notch is substantially commensurate in width with bolt 96 and allows substantially no movement of the handle when the bolt is engaged in the notch as shown in Figs. 2 and 9. Adjacent notch 104 is a long notch 110 into which the bolt 96 is projected when the handle 65 is moved to fill position and which allows the handle to be moved freely from fill to car position and back again. The handle cannot, however, be moved from fill to drain position for the bolt 96 will engage the upper extremity of notch 110 and prevent such action. Consequently, it is necessary to withdraw bolt 96 and this necessitates the insertion of a key in the slot 102.

To render difficult the movement of the handle 65 from drain to fill position or vice versa, the dial plate 66, above mentioned, is made to function as a shield for the locking device and particularly for the key slot 102. This dial plate is secured by screws 108 to disk 105, suitable spacing sleeves 109 being applied over the screws and between the disk and plate to keep the two in spaced relation. The lower part of the handle is received between the plate and disk, as clearly shown in Fig. 1 and the plate covers the key slot 102 and prevents access thereto, except at certain locations where holes 112 and 114 are provided. When handle 65 occupies drain position, the key slot 102 lies opposite hole 112 and the key can be inserted therein to withdraw bolt 96 from slot 104. The slot 112 is long enough to permit handle 65 to be moved part way toward fill position when bolt 65 is withdrawn but it cannot be moved to fill position until the key is withdrawn from slot 102. It can be moved far enough so that, when the key is withdrawn, the bolt 96 engages the periphery of disk 105 and does not again enter notch 104. Therefore, after the bolt has been thus positioned and the key withdrawn, handle 65 can be moved to fill position or beyond but, immediately it is so moved, bolt 96 engages in notch 110. Consequently handle 65 can not then be moved back to drain position without the use of the key. The handle, when moved to fill position brings key slot 102 opposite hole 114 and the key can then be inserted in slot 102 to withdraw bolt 96 from slot 110. Hole 114 is long enough to permit handle 65 to be moved part way toward drain position while the key is in place in slot 102 and sufficiently far so that bolt 96 when released engages the periphery of plate 105 and does not again enter notch 110.

Thus, when the handle is to be moved from fill to drain position or vice versa, the operator must move handle 65 to a certain position, insert the key, move the handle slightly in the desired direction, and then withdraw the key, after which the handle can be moved to the desired position. So much manipulation is required on the part of the operator as to discourage him from cheating by occasionally moving the handle from fill to drain position during the filling operation. If attempted, irregular manipulation of handle 65 would be readily detected.

As a practical result of this construction however, the operator of the pump will realize the amount of manipulation necessary to thus move the handle back to drain position while the liquid is being pumped into the reservoir 10 or while it is being delivered to the customer and inasmuch as the operator cannot thus move the handle readily and surreptitiously he will refrain from attempting to do so at all and the customer is assured of receiving the full amount of liquid which he has purchased.

To prevent the possibility of the locking bolt 96 being pried out of the notch 104 by the use of a lock-picking implement, the operating handle 65 is provided with two segmental guard fingers or shields 122 which extend in opposite directions from the lateral edges of the handle, the inner segmental faces of said fingers being concentric with the periphery of the locking disk 105 and lying closely adjacent thereto. The guard fingers 122 are of sufficient length and are so disposed as effectually to carry out the purpose for which they are designed.

It will be understood that the present apparatus may be converted from a pump of the visible measuring type to a pump of the non-visible measuring type by merely closing the supply valve 27. The liquid entering the supply chamber 22 from the supply pipe 25 will then be unable to gain access to the reservoir 10 and will be delivered directly through the discharge pipe 28 and delivery hose 32 when the delivery valve 56 is opened and the pump piston is actuated. It is evident, therefore that a convertible pump of this type is still capable of being operated to dispense measured quantities of liquid even though the transparent measuring tank becomes broken.

The operation of the apparatus may be summarized as follows: The handle 65 is positioned, as illustrated, when the pump is not in use and when thus positioned the delivery valve is closed and the drain valve open. Both of these valves are also locked in the described positions. In normal service, the handle 65 occupies fill position and is moved from fill to car position as required, being freely movable between these positions at the will of the operator. It cannot be moved back to drain position without the use of the key and the above described manipulations, all of which require so much effort on the part of the operator as to discourage him from the attempt. The practical result is that the operator cannot open the drain valve during the operation of filling the reservoir and thus defraud the customer.

While the drawings illustrate and the specification describes what is at present considered to be the preferred form of the invention it will be understood that various changes in the form and arrangement of the parts may be made without departing from the spirit of the invention.

The invention having been described what is claimed and desired to secure by Letters Patent is:—

1. The combination with a measuring pump, of a visible measuring reservoir, a frame for supporting the latter from the former, including a part forming a base for the reservoir, a supply chamber provided in said part below the base of said reservoir, a passage provided in said base to connect said chamber and reservoir, a supply connection from the pump to said chamber, a discharge pipe leading from the latter, a valve in the discharge pipe, a normally open valve for said passage and opening upwardly into said reservoir, and means for closing said valve and applying pressure thereto to resist the pressure of the pumped fluid thereagainst.

2. In a liquid dispensing apparatus, a reservoir, an outlet connection for said reservoir through which the liquid dispensed therefrom is delivered, a second outlet connection for the reservoir through which the entire contents thereof may be drained, a delivery valve in the first named connection, a drain valve in the second named connection, means for each valve tending to move the same to closed position, and mechanism for controlling the opening and closing of both valves, said mechanism including a common operating member operable when moved in one direction to one extreme position to open the delivery valve and when moved in the other direction to another extreme position to open the drain valve and when in an intermediate position to release both valves and allow the same to close.

3. In a liquid dispensing apparatus, a reservoir, an outlet connection for said reservoir through which the liquid dispensed therefrom is delivered, a second outlet connection for the reservoir through which the entire contents thereof may be drained, a delivery valve in the first named connection, a drain valve in the second named connection, means for each valve tending to move the same to closed position, mechanism for controlling the opening and closing of both valves, said mechanism including a common operating member operable when moved in one direction to one extreme position to open the delivery valve and when moved in the other direction to another extreme position to open the drain valve and when in an intermediate position to release both valves and allow the same to close, and means for locking said operating member against movement in one of said directions from said intermediate position.

4. In a liquid dispensing apparatus, a reservoir, an outlet connection for said reservoir through which the liquid dispensed therefrom is delivered, a second outlet connection for the reservoir through which the entire contents thereof may be drained, a delivery valve in the first named connection, a drain valve in the second named connection, means for each valve tending to move the same to closed position, mechanism for controlling the opening and closing of both valves, said mechanism including a common operating member operable when moved in one direction to one extreme position to open the delivery valve and when moved in the other direction to another extreme position to open the drain valve and when in an intermediate position to release both valves and allow the same to close, and means for locking said operating member against movement when so positioned as to hold the drain valve open.

5. In a liquid dispensing apparatus, a reservoir, an outlet connection for said reservoir through which the liquid dispensed therefrom is delivered, a second outlet connection for the reservoir through which the entire contents thereof may be drained, a delivery valve in the first named connection, a drain valve in the second named connection, means for each valve tending to move the same to closed position, mechanism for controlling the opening and closing of both valves, said mechanism including a common operating member operable when moved in one direction to one extreme position to open the delivery valve and when moved in the other direction to another extreme position to open the drain valve and when in an intermediate position to release both valves and allow the same to close, and means including a key-releasable lock to prevent said operating member from being moved from said intermediate position to the second named extreme position.

6. In a liquid dispensing apparatus, a reservoir, an outlet connection for said reservoir through which the liquid dispensed therefrom is delivered, a second outlet connection for the reservoir through which the entire contents thereof may be drained, a delivery valve in the first named connection, a drain valve in the second named connection, means for each valve tending to move the same to closed position, mechanism for controlling the opening and closing of both valves, said mechanism including a common operating member operable when moved in one direction to one extreme position to open the delivery valve and when moved in the other direction to another extreme position to open the drain valve and when in an intermediate position to release both valves and allow the same to close, a lock carried by said operating member including a key-retractible spring-projected bolt, and a stationary part closely adjacent the path of travel of said operating member, said part provided with a recess to receive said bolt when the operating member is in the second named extreme position and to prevent movement of said operating member therefrom, and another recess provided in said part to receive said bolt when said operating member is in the first named extreme position or in said intermediate position and to permit free movement therebetween.

7. In a liquid dispensing apparatus, a reservoir, an outlet connection for said reservoir through which the liquid dispensed therefrom is delivered, a second outlet connection for the reservoir through which the entire contents thereof may be drained, a delivery valve in the first named connection, a drain valve in the second named connection, means for each valve tending to move the same to closed position, mechanism for controlling the opening and closing of both valves, said mechanism including a common operating member operable when moved in one direction to one extreme position to open the delivery valve and when moved in the other direction to another extreme position to open the drain valve and when in an intermediate position to release both valves and allow the same to close, a lock carried by said operating member including a key-retractible spring-projected bolt, a stationary part closely adjacent the path of travel of said operating member, said part provided with a recess to receive said bolt when the operating member is in the second named extreme position and to prevent movement of said operating member therefrom, another recess provided in said part to receive said bolt when said operating member is in the first named extreme position or in said intermediate position and to permit free movement therebetween, and a stationary guard closely adjacent the path of travel of said operating member and so disposed relatively thereto as to prevent access to the key hole of said lock, said guard provided with spaced openings one of which registers with said key hole when said operating member is in the second named intermediate position and the other when said operating member is in the intermediate position.

8. In a liquid dispensing apparatus, a reservoir, an outlet connection for said reservoir through which the liquid dispensed therefrom is delivered, a second outlet connection for the reservoir through which the entire contents thereof may be drained, a delivery valve in the first named connection, a drain valve in the second named connection, means for each valve tending to move the same to closed position, mechanism for controlling the opening and closing of both valves, said mechanism including a common operating member operable when moved in one direction to one extreme position to open the delivery valve and when moved in the other direction to another extreme position to open the drain valve and when in an intermediate position to release both valves and allow the same to close, a lock carried by said operating member including a key-retractible spring-projected bolt, a stationary part disposed adjacent the path of travel of said operating member and having a projection disposed in the path of the projected bolt and adapted to be engaged thereby to prevent movement of said operating member between said intermediate and second-named extreme positions, whereby the operating member when in the intermediate or first named extreme position cannot be moved to open the drain valve without first retracting said bolt.

9. In a liquid dispensing apparatus, a reservoir, an outlet connection for said reservoir through which the liquid dispensed therefrom is delivered, a second outlet connection for the reservoir through which the entire contents thereof may be drained, a delivery valve in the first named connection, a drain valve in the second named connection, means for each valve tending to move the same to closed position, mechanism for controlling the opening and closing of both valves, said mechanism including a common operating member operable when moved in one direction to one extreme position to open the delivery valve and when moved in the other direction to another extreme position to open the drain valve and when in an intermediate position to release both valves and allow the same to close, a lock carried by said operating member including a key-retractible, spring-projected bolt, a stationary part disposed adjacent the path of travel of said operating member and having a projection disposed in the path of the projected bolt and adapted to be engaged thereby to prevent movement of said operating member between said intermediate and second-named extreme position, and a stationary guard disposed closely adjacent the path of travel of said operating member and so as to prevent access to the key hole of said lock, said guard provided with two spaced openings so located as to allow access therethrough to said key hole when said operating member is in the intermediate and in the second-named extreme positions, each of said openings being long enough to permit the operating member to be moved, while the key is inserted therethrough and in said lock, partially toward the other opening and sufficiently to allow the retracted bolt to be carried beyond said projection, whereby when the key is then removed the bolt is held retracted by said projection and the operating member can then be moved to carry said bolt to the opposite side of said projection.

10. In a liquid dispensing apparatus, a reservoir, an outlet connection for said reservoir through which the liquid dispensed therefrom is delivered, a second outlet connection for the reservoir through which the entire contents thereof may be drained, a delivery valve in the first named outlet connection, a drain valve in the second named outlet connection, a spring for each valve to move the same to closed position, a common operating lever for controlling the opening and closing of both valves and mounted to swing in opposite directions from an intermediate position to two extreme positions, an arm connected to be moved by said lever and operable to engage and open the delivery valve when the lever is moved from the intermediate to one of said extreme positions and to release the valve for closing when the lever is moved back again, and a second arm connected to be moved by said lever and operable to engage and open the drain valve when the lever is moved from the intermediate to the other extreme position and to release the valve for closing when moved back again.

11. In a liquid dispensing apparatus, a reservoir, an outlet connection for said reservoir through which the liquid dispensed therefrom is delivered, a second outlet connection for the reservoir through which the entire contents thereof may be drained, a delivery valve in the first named outlet connection, a drain valve in the second named outlet connection, a spring for each valve to move the same to closed position, a common operating lever for controlling the opening and closing of both valves and mounted to swing in opposite directions from an intermediate position to two extreme positions, an arm for operating the drain valve, an arm for operating the delivery valve, said arms connected to be simultaneously moved by said lever, both arms being positioned so that their valves are closed when said lever is in said intermediate position and each arm being movable away from its valve while the other is engaged with and moving its valve, whereby the lever when swung in one direction from the intermediate position will open the delivery valve and when swung in the opposite direction will open the drain valve.

12. In a liquid dispensing apparatus, a reservoir, delivery and drain valves therefor, a spring for each valve to move the same to closed position, a common operating lever for controlling the opening and closing of both valves and mounted to swing in opposite directions from an intermediate position to two extreme positions, an arm for operating the drain valve, an arm for operating the delivery valve, said arms connected to be simultaneously moved by said lever, both arms being positioned so that their valves are closed when said lever is in said intermediate position and each arm being movable away from its valve while the other is engaged with and moving its valve, whereby the lever when swung in one direction from the intermediate position will open the delivery valve and when swung in the opposite direction will open the drain valve, a second spring associated with the drain valve and adapted to be engaged by the drain valve arm and compressed while the delivery valve arm is opening its valve, the stress of the last named spring supplementing the stress of the first named drain valve spring to hold the drain valve in closed position.

13. In a liquid dispensing apparatus, a reservoir, delivery and drain valves therefor, a spring for each valve to move the same to closed position, a common operating lever for controlling the opening and closing of both valves and mounted to swing in opposite directions from an intermediate position to two extreme positions, an arm for operating the drain valve, an arm for operating the delivery valve, said arms connected to be simultaneously moved by said lever, both arms being positioned so that their valves are closed when said lever is in said intermediate position and each arm being movable away from its valve while the other is engaged with and moving its valve, whereby the lever when swung in one direction from the intermediate position will open the delivery valve and when swung in the opposite direction will open the drain valve, a second spring associated with the drain valve and adapted to be engaged by the drain valve arm and progressively compressed during the progressive opening of the delivery valve and finally fully compressed when the latter is fully opened, said second spring acting to supplement the yielding closing pressure exerted by the first named drain valve spring and when fully compressed to unyieldingly hold the drain valve closed.

14. In a liquid dispensing apparatus, a measuring reservoir, a drain valve therefor, a spring operable to move the valve to closed position, an operating member operable when moved in one direction to open the valve against the pressure of said spring and when moved in the opposite direction to allow said valve to close and a second spring adapted to be stressed by further movement of said member in the last named direction and to transmit its stress to said valve to hold the same closed.

15. In a liquid dispensing apparatus, a reservoir, delivery and drain valves therefor, a common operating lever controlling both valves and operable to open one while closing the other, a support to which said lever is pivoted, stationary discs on opposite sides of said lever between which the latter swings, said lever having an offset portion to overlie the periphery of one of said discs, and a lock carried by said lever having a key-retractible spring-projected bolt normally pressed toward said periphery, a notch provided in the periphery of the last named disc to receive said bolt when said lever is positioned to open the drain valve and prevent movement of the lever when so positioned, a relatively long recess provided in the second named disc and spaced from said notch, said recess adapted to receive said bolt when the lever is positioned to close the drain valve and to permit free movement of the lever for opening and closing the delivery valve.

16. In a liquid dispensing apparatus, a reservoir, delivery and drain valves therefor, a common operating lever controlling both valves and operable to open one while closing the other, a support to which said lever is pivoted, stationary discs on opposite sides of said lever between which the latter swings, said lever having an offset portion to overlie the periphery of one of said discs, a lock carried by said lever having a key-retractible, spring-projected bolt normally pressed toward said periphery, a notch provided in the periphery of the last named disc to receive said bolt when said lever is positioned to open the drain valve and prevent movement of the lever when so positioned, a relatively long recess provided in the second named disc and spaced from said notch, said recess adapted to receive said bolt when the lever is positioned to close the drain valve and to permit free movement of the lever for opening and closing the delivery valve, and spaced openings provided in the other disc through which access may be had to the key hole of said lock when said lever is so positioned that the drain valve is opened or closed.

17. In a liquid dispensing apparatus, a visible measuring reservoir having a drain passage leading therefrom, a drain valve movable axially of said passage, and means for actuating said valve comprising a rod carrying said valve and slidable in the direction of movement thereof, an abutment fixed upon said rod, a washer slidable upon said rod, a rocker arm movable about an axis perpendicular to said rod and having its free extremity interposed between said abutment and said washer, an expansion spring bearing at one end against said abutment and tending to move said rod in a direction to close the drain valve, a stationary abutment for the opposite end of said spring, a second expansion spring tending to hold said washer against said rocker member, a shoulder on said rod for engaging the opposite end of the second spring, and means for actuating said rocker member in one direction to compress the first spring and open the drain valve, and for actuating said rocker member in the opposite direction to relieve the compression of said spring thereby enabling the rocker member to close the drain valve, to compress the second spring and to hold the drain valve closed under progressively increasing pressure.

18. In a liquid dispensing apparatus, a visible measuring reservoir having a drain passage leading therefrom, a drain valve movable axially of said passage, and means for actuating said valve comprising a rod carrying said valve and slidable in the direction of movement thereof, an abutment fixed upon said rod, a washer slidable upon said rod, a rocker arm movable about an axis perpendicular to said rod and having its free extremity interposed between said abutment and said washer, an expansion spring bearing at one end against said abutment and tending to move said rod in a direction to close the drain valve, a stationary abutment for the opposite end of said spring, a second expansion spring tending to hold said washer against said rocker member, a shoulder on said rod for engaging the opposite end of the second spring, and means for actuating said rocker member in one direction to compress the first spring and open the drain valve and for actuating said rocker member in the opposite direction to relieve the compression of said spring to enable it to close the drain valve, to compress the second spring and to hold said valve closed under progressively increasing pressure, the movement of said rocker member and the construction of said spring being such that the coils of the latter will finally be closed solidly together so that the drain valve will be rigidly held in closed position.

19. In a liquid dispensing apparatus, a reservoir, delivery and drain valves therefor, a common operating lever controlling both valves and operable to open one while allowing the other to close, a support to which said lever is pivoted, stationary discs on opposite sides of said lever between which the latter swings, said lever having an offset portion to overlie the periphery of one of said discs, a lock carried by said lever having a key-retractible spring-projected bolt normally pressed toward said periphery, a notch provided in the periphery of the last named disc to receive said bolt when said lever is positioned to open the drain valve and prevent movement of the lever when so positioned, a relatively long recess provided in the second named disc and spaced from said notch, said recess adapted to receive said bolt when the lever is positioned to close the drain valve and to permit free movement of the lever for opening and closing the delivery valve, and curved wing extensions on opposite sides of said lever to closely overlie the periphery of the last named disc and completely cover said recess at all times when said bolt is engaged therein.

In testimony whereof I have affixed my signature.

JOHN B. DAVIS.